(12) United States Patent
Rakesh et al.

(10) Patent No.: US 11,809,281 B2
(45) Date of Patent: Nov. 7, 2023

(54) METADATA MANAGEMENT FOR SCALED AND HIGH DENSITY BACKUP ENVIRONMENTS

(71) Applicant: EMC IP Holding Company LLC, Hopkinton, MA (US)

(72) Inventors: Aaditya Rakesh, Bangalore (IN); Upanshu Singhal, Bangalore (IN); Adam Brenner, Mission Viejo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 281 days.

(21) Appl. No.: 17/235,663

(22) Filed: Apr. 20, 2021

(65) Prior Publication Data

US 2022/0334925 A1 Oct. 20, 2022

(51) Int. Cl.
*G06F 11/14* (2006.01)
*G06F 16/182* (2019.01)
*G06F 16/16* (2019.01)
*G06F 11/20* (2006.01)

(52) U.S. Cl.
CPC ........ *G06F 11/1451* (2013.01); *G06F 16/164* (2019.01); *G06F 16/1824* (2019.01); *G06F 2201/82* (2013.01)

(58) Field of Classification Search
CPC ............... G06F 11/1451; G06F 16/164; G06F 16/1824; G06F 2201/82; G06F 16/1827; G06F 2201/81; G06F 11/1448; G06F 2201/815; G06F 2201/84; G06F 11/16; G06F 3/067; G06F 11/1484; G06F 11/2064; G11B 20/18; G11B 27/36; G11C 29/00; H04L 67/1097
See application file for complete search history.

(56) References Cited

U.S. PATENT DOCUMENTS

| | | | | |
|---|---|---|---|---|
| 7,606,868 | B1 * | 10/2009 | Le | G06F 16/10 718/1 |
| 8,078,652 | B2 * | 12/2011 | Basu | G06F 16/2462 707/963 |
| 9,569,446 | B1 * | 2/2017 | Feathergill | G06F 16/128 |
| 2005/0223278 | A1 * | 10/2005 | Saika | G06F 11/1461 714/E11.124 |
| 2009/0063430 | A1 * | 3/2009 | Anglin | G06F 16/40 |

(Continued)

*Primary Examiner* — Pierre M Vital
*Assistant Examiner* — Cecile H Vo
(74) *Attorney, Agent, or Firm* — Staniford Tomita LLP

(57) ABSTRACT

Embodiments for managing metadata in a high density network attached storage system. A change file list is obtained though external or internal crawler processes. A slicer creates multiple slices of the entire fileshare to enable parallel backup of the slices. A backup engine creates a separate backup containers and separate metadata files for each slice. The individual metadata files are combined into a single consolidated metadata file, and the individual metadata files are then deleted. The consolidated metadata file contains all of the elements comprising the entire fileshare, and a corresponding container ID is also added to each entry of the file. Another table contains details of the sub-assets and their backup properties. A backup agent obtains the backup IDs for the individual sub-assets, using a job ID field for a backup query operating on the single consolidated metadata file.

13 Claims, 12 Drawing Sheets

(56) References Cited

U.S. PATENT DOCUMENTS

| | | | | |
|---|---|---|---|---|
| 2012/0254689 | A1* | 10/2012 | Resch | H04L 9/0891 |
| | | | | 714/763 |
| 2017/0131934 | A1* | 5/2017 | Kaczmarczyk | G06F 3/0673 |
| 2020/0104050 | A1* | 4/2020 | Srinivasan | G06F 3/067 |
| 2020/0333979 | A1* | 10/2020 | Reese | G06F 3/065 |
| 2021/0374159 | A1* | 12/2021 | Chu | G06F 16/275 |

* cited by examiner

1005

| Change File List | Corresponding Previous Backup ID |
|---|---|
| /ifs/dir-1/file1 | dir-1-12345 |
| /ifs/dir-2/file2a | dir-2-12345 |
| /ifs/dir-2/file2b | dir-2-12345 |
| /ifs/dir-2/file2c | Not available (New File) |
| /ifs/dir-4/file4a | dir-4-12345 |
| /ifs/dir-4/file4b | dir-4-12345 |
| /ifs/dir-5/file5 | dir-5-12345 |
| /ifs/dir-6/file6 | dir-6-12345 |
| /ifs/dir-7/ | Not Available |

| Change File List | Corresponding Previous Backup ID | Corresponding Sub-Asset Name |
|---|---|---|
| /ifs/dir-1/file1 | dir-1-12345 | /ifs/dir-1 |

| Change File List | Corresponding Previous Backup ID | Corresponding Sub-Asset Name |
|---|---|---|
| /ifs/dir-2/file2a | dir-2-12345 | /ifs/dir-2 |
| /ifs/dir-2/file2b | dir-2-12345 | /ifs/dir-2 |
| /ifs/dir-2/file2c | dir-2-12345 | /ifs/dir-2 |

| Change File List | Corresponding Previous Backup ID | Corresponding Sub-Asset Name |
|---|---|---|
| /ifs/dir-4/file4a | dir-4-12345 | /ifs/dir-4 |
| /ifs/dir-4/file4b | dir-4-12345 | /ifs/dir-4 |

| Change File List | Corresponding Previous Backup ID | Corresponding Sub-Asset Name |
|---|---|---|
| /ifs/dir-5/file5 | dir-5-12345 | /ifs/dir-5 |

| Change File List | Corresponding Previous Backup ID | Corresponding Sub-Asset Name |
|---|---|---|
| /ifs/dir-6/file6 | dir-6-12345 | /ifs/dir-6 |

| Change File List | Corresponding Previous Backup ID | Corresponding Sub-Asset Name |
|---|---|---|
| /ifs/dir-7 | Not Available | /ifs/dir-7 (New SUB-ASSET FOR FS Agent) |

FIG. 11

METADATA MANAGEMENT FOR SCALED AND HIGH DENSITY BACKUP ENVIRONMENTS

TECHNICAL FIELD

Embodiments are generally directed to large-scale backup systems, and more specifically to efficient metadata management for network attached storage (NAS) devices.

BACKGROUND

Data protection comprising backup and recovery software products are crucial for enterprise-level network clients. Customers rely on backup systems to efficiently back up and recover data in the event of user error, data loss, system outages, hardware failure, or other catastrophic events to allow business applications to remain in service or quickly come back up to service after a failure condition or an outage. Data storage media for such systems typically relies on the use of large numbers of disks or disk arrays (e.g., RAID arrays). In a network environment, network-attached storage (NAS) devices are commonly used. NAS is a file-level (as opposed to a block-level) networked storage server that provides data access to a heterogenous group of clients, and is often embodied in special purpose storage appliances.

Data protection of NAS and similar devices is currently achieved using one of three methods: (1) array snapshots, (2) use of NDMP protocol, or (3) file system crawlers. These three methods, present some problems when it comes to storing and searching for filesystem metadata. For example, array snapshots do not provide filesystem metadata access as they function at the block level and not at a file level. The NDMP (Network Data Management Protocol) was developed to transport data between NAS and backup devices thus removing the need to transport the data through the backup server itself. Using NDMP, however, requires reverse engineering the data stream, which makes the solution highly specific to each vendor's implementation. Filesystem crawlers overcome the challenges of the array snapshot and NDMP approaches, but typically store metadata in a format that is not scalable for dense filesystems.

Some of these challenges have tried to be addressed through certain solutions, such as slicing a main NAS asset into smaller sub-assets and using a filesystem crawler based mechanism to protect NAS shares assets. Though this may address some of the challenges by protecting the complete asset with optimal usage of resources, it still presents unique challenges with the handling of metadata for these sub-assets and the complete backup target as a whole. These metadata issues can create bottlenecks in business continuity with respect to global indexing, incremental backups, and load balancing. For example, global indexing becomes an issue because of the multiple segregated metadata elements over multiple backups; forever incremental backup mechanisms become a bottleneck because of such separate metadata elements; and real-time data load balancing cannot be done with existing metadata management frameworks.

What is needed, therefore, is a method that enhances filesystem crawlers to make storing and searching for metadata scalable in high density NAS storage networks.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. DellEMC, NetWorker, Data Domain, Data Domain Restorer, and PowerProtect Data Manager (PPDM) are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 10 is a table that illustrates a query result for the consolidated metadata table of FIG. 9.

FIG. 11 is a table that illustrates example sub-assets for previous backup operations, under an example embodiment.

DETAILED DESCRIPTION

Figure 1:
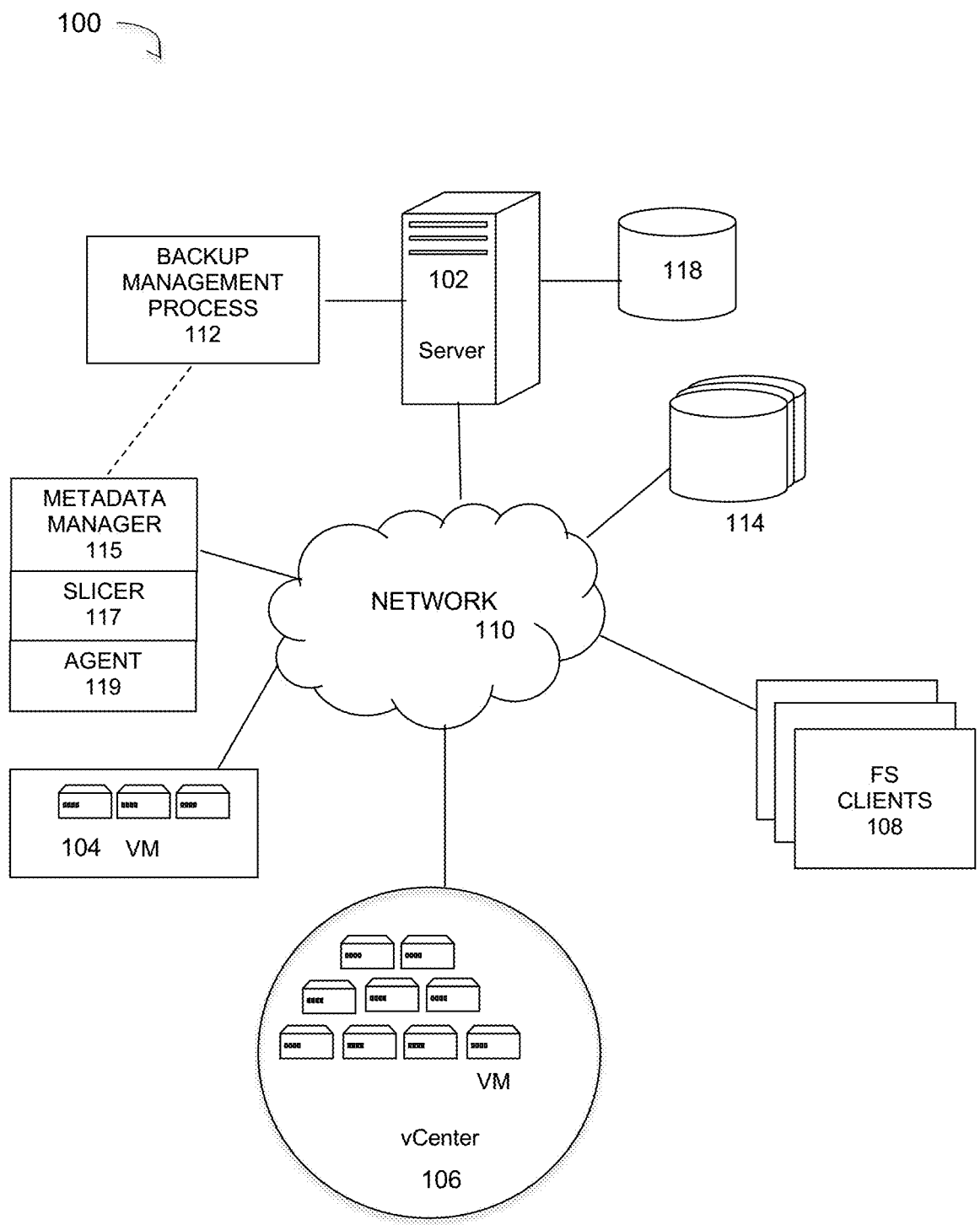
FIG. 1 is a diagram of a large-scale data backup system implementing a file system slicer and backup agent process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. The computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

The network may be a data storage network comprising large numbers of storage devices, such as disk drives, tape drives, solid state devices (SSD or flash), and the like. These storage devices may be organized in one or more arrays, and implement data storage protocols, such a network attached storage (NAS), or similar file system based backup protocol. FIG. 1 illustrates a computer network system 100 that implements one or more embodiments of a metadata management system for high density backup environments for NAS devices. System 100 represents a network backup system that can backup data from one or more data sources to one or more different storage media domains, such as a physical disk storage domains and virtual hard disk (VHD) domains.

Embodiments provide a metadata management system that enhances filesystem crawlers to make storing and searching for metadata scalable for large-scale networks. It does this by splitting filesystem metadata into its own unified catalog, separate from the operational (data) catalog, thus allowing each filesystem crawler to work independently as separate threads or processes.

Embodiments can be used in a physical storage environment, a virtual storage environment, or a mix of both, running a deduplicated backup program. In an embodiment, system 100 includes a number of virtual machines (VMs) or groups of VMs that are provided to serve as backup targets. Such target VMs may be organized into one or more vCenters (virtual centers) 106 representing a physical or virtual network of many virtual machines (VMs), such as on the order of thousands of VMs each. The VMs serve as target storage devices for data backed up from one or more data sources, such as file system (FS) clients 108. Other data sources having data to be protected and backed up may include other VMs 104 and data in network storage 114.

The data sourced by the data source may be any appropriate type of data, such as database data that is part of a database management system. In this case, the data may reside on one or more storage devices of the system, and may be stored in the database in a variety of formats. One example is an Extensible Markup Language (XML) database, which is a data persistence software system that allows data to be stored in XML format.

A network server computer 102 is coupled directly or indirectly to the target VMs 106, and to the data sources 108 and 109 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

The data sourced by system 100 may be stored in any number of other storage locations and devices, such as local client storage, server storage (e.g., 118), or network storage (e.g., 114), which may at least be partially implemented through storage device arrays, such as RAID components. In an embodiment, network storage 114 and even server storage 118 may be embodied as iSCSI (or similar) disks that provide dynamic disk storage. In an embodiment, the storage devices 114 represent NAS devices or appliances, but other types of storage architectures may also be used, such as storage area network (SAN) or any other protocol that makes use of large-scale network accessible storage devices 114, such as large capacity disk (optical or magnetic) arrays.

For the embodiment of FIG. 1, network system 100 includes a server 102 that functions as a backup server by executing a backup management process 112 that automates the backup of network data using the target VM devices or the NAS (or other) storage devices 114. In an embodiment, the backup process 112 uses certain known full and incremental (or differencing) backup techniques along with a snapshot backup process that is used to store an image or images of the system(s) to be backed up prior to the full or incremental backup operations.

In an embodiment, the network system of FIG. 1 may be implemented as a DellEMC PowerProtect Data Manager (or similar) data protection system. This is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC Data Domain and other similar storage solutions. Thus, server 102 may be implemented as a DDR Deduplication Storage server provided by DellEMC Corporation. However, other similar backup and storage systems are also possible. In a general implementation, a number of different users (or subscribers) may use backup management process 112 to back up their data on a regular basis to virtual or physical storage media for purposes of data protection. The saved datasets can then be used in data restore operations to restore any data that may be lost or compromised due to system failure or attack.

As stated above, embodiments are used in NAS networks to provide data protection using snapshot backups. In general, NAS is a file-level storage architecture that provides a single access point for storage with built-in security, management, and fault-tolerance. A snapshot copy is a point-in-time copy of data that represents an image of a volume that can be used for data recovery of individual files or entire virtual machines or application servers. Snapshots in a storage array are managed by manipulating the metadata that is used to track the logical-physical relationship of LUNs and volumes to data on disk. When a snapshot copy is taken, the array replicates the metadata that maps the physical layout on the disk. An array-based snapshot is a copy of the image of a running virtual machine (VM) or application server at a specific point in time and, as a result, the snapshot will appear as a "crash copy" of that VM or application if it is fully restored and accessed. The snapshots on the array are based on a LUN or volume, which in turn, will map to a datastore in the hypervisor.

Array snapshots are typically provided in a proprietary vendor format and do not allow customers or backup vendors to restore data to an alternate device/model but only back to the same device/model. The Network Data Management Protocol (NDMP) was developed to transport data between network attached storage (NAS) devices and backup devices. This removes the need for transporting the data through the backup server itself, thus enhancing speed and removing load from the backup server. NDMP is a popular protocol which has been an industry standard for many years, but it also has challenges. Namely, NDMP has limited parallel capabilities, is not able to scale to many hundreds of terabytes, and requires specific workarounds for each vendor implementation of NDMP.

File system crawlers have been developed to work on network attached storage (NAS) devices and can solve certain challenges with array snapshots and NDMP. However, file system crawlers are considered slow due to having to traverse millions and billions of files over a network connection just to determine if a file has been modified. Current solutions run file system crawlers in parallel, which requires a first pass to determine the layout of the system and then backup the data. Other solutions involve providing NAS array APIs to identify which files have changed through processor-intensive tasks such as change file tracking or snapshot differencing. As stated above, present file system crawlers pose problems with metadata management in large-scale or high-density backup environments in that they store metadata in a format that is typically not scalable to required levels.

To overcome this significant disadvantage, embodiments of backup process 112 and network 100 include a metadata manager process 115 that makes metadata access (storing/searching scalable by splitting the metadata into a separate catalog, apart from the data catalog. This allows each filesystem crawler to work independently as separate threads or processes. This process for handling the metadata for NAS backup and protection operations provides certain distinct advantages, such as handling metadata effectively without duplication and redundant usage of storage by utilizing efficient consolidation mechanisms, allowing global indexing and searching operation on the backup contents, allowing seamless File Level Recovery (FLR) for individual elements from a backup session, and providing effective forever incremental data protection.

In an embodiment, the metadata manager process 115 uses a slicer mechanism 117. In this system, NAS Backup agents 119 crawl the NAS share and create multiple slices of the entire share to backup these slices in parallel. The backup engine 112 creates separate backup containers, such as CDSF containers and metadata files for each individual slice it receives. This information is then accessed by the NAS backup agent for further processing using the system generated backup Job ID field for query. The NAS backup agent gets the system generated unique saveset backup identifiers (SSIDs) of the individual sub-assets, where a 'sub-asset' corresponds to an individual slice.

Figure 2:
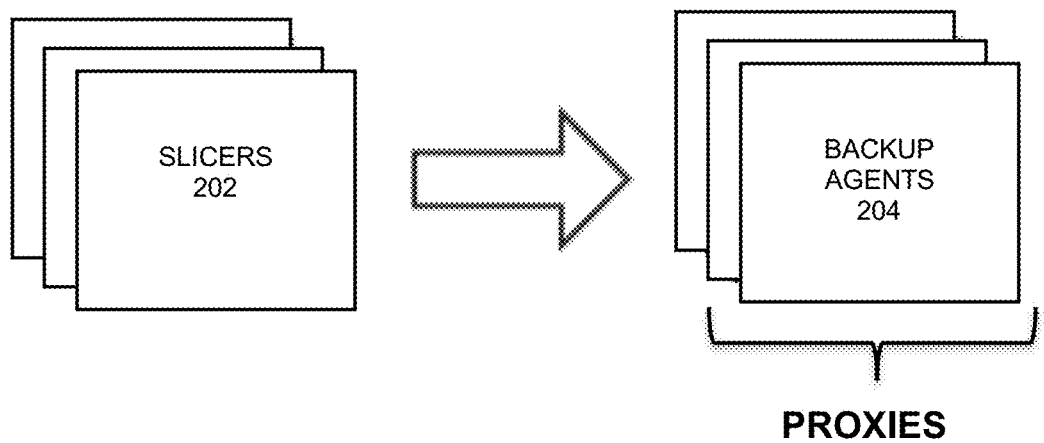
FIG. 2 illustrates the relationship of a file system slicer and backup agents for the system of FIG. 1, under some embodiments.
Figure 3:
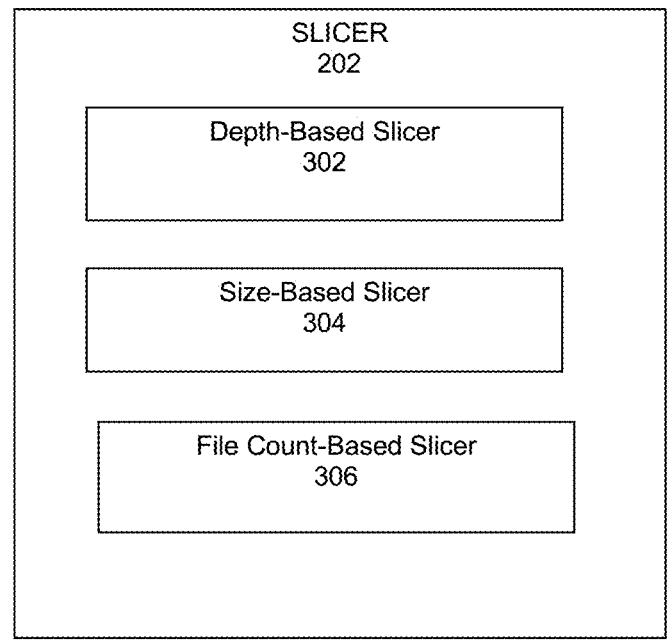
FIG. 3 illustrates three example slice techniques that can be used for the slicer, under some embodiments.

Process 115 thus uses one or more file system slicer processes 117 and backup agent(s) 119. The slicer 117 breaks up the file system into slices (units of work or sub-assets), and the backup agent 119 performs the backup tasks. FIG. 2 illustrates the relationship of a file system slicer and backup agents for the system of FIG. 1, under some embodiments. The purpose of the slicer 202 is to break up the file system in slices and hand those slices off to backup agent 204 for processing. The slicer will store all information a catalog such as a relation database or NoSQL key/value store. Any number of techniques can be used to slice the file system. FIG. 3 illustrates three example slice techniques that can be used for the slicer 202, and each slice technique solves a particular problem that is faced in present file system crawlers. As shown in FIG. 3, the file system techniques can include depth-based slicing 302, size-based slicing 304, and file count-based slicing 306.

Figure 4:
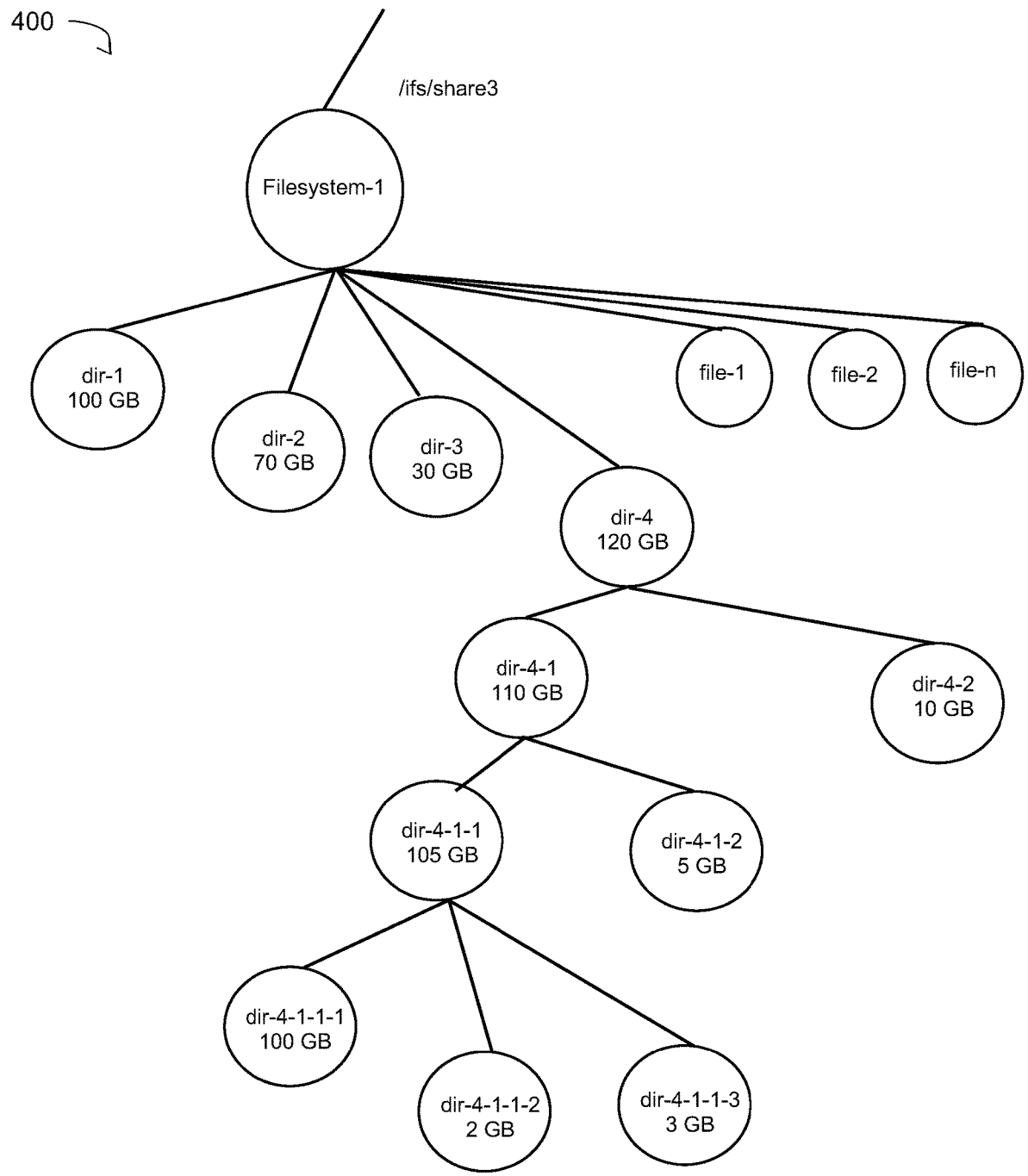
FIG. 4 is an example file system layout illustrating operation of the slicing methods of FIG. 3, under some embodiments.

FIG. 4 is an example file system layout illustrating operation of the slicing methods of FIG. 3, under some embodiments. The depth-based slicing technique 302 is usually used for file systems that are deep and dense. The slicer 202 can slice the file system by the number of directories and files and based on depth of directories and files of the share. Using the file system directory example of FIG. 4, with a proposed slice of one level depth, the slicer would return five slices: Slices 1-4 would be the directories dir-1, dir-2, dir-3 and dir-4, and slice 5 would be the files file-1, file-2 and file-n. This information is then passed to the backup agent 204.

Figure 5:
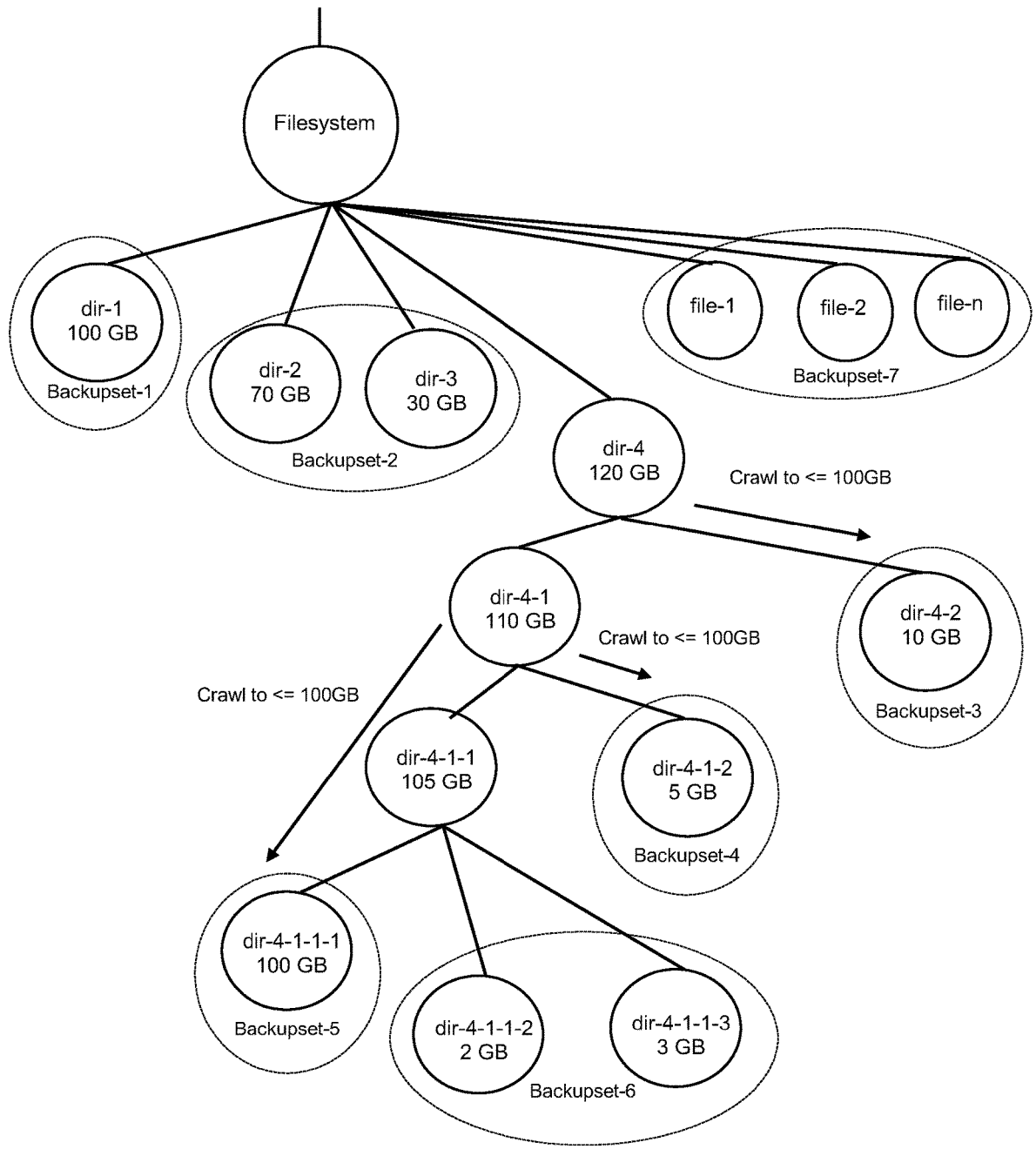
FIG. 5 illustrates the example file system layout of FIG. 4 sliced in these seven example slices.

For file systems that are large in size, size-based slicing 304 is used. In this method, the slicer 202 slices the file system by the size of files. Using the FIG. 4 example file system layout, the slicer could propose seven slices. Assuming that the slicer is configured to slice at 100 GB boundary, the slices can be as follows: Slice 1 is directory 1; Slice 2 is directories dir-2 and dir-3; Slice 3 is directory-4-2; Slice 4 is directory-4-1-2; Slice 5 is directory-4-1-1-1; Slice 6 is directory-4-1-1-2 and directory-4-1-1-3; and Slice 7 are all the files at the top most directory, assuming the combination of all is less then 100 GB. In general, a single file is the smallest unit of granularity, and a very large file can constitute a file itself. FIG. 5 illustrates the example file system layout of FIG. 4 sliced in these seven example slices. As shown in FIG. 5, Backupset-1 corresponds to Slice 1 (dir-1), Backupset-2 corresponds to Slice 2 (dir-1, dir-3), Backupset-3 corresponds to Slice 3 (dir-4-2), Backupset-4 corresponds to Slice 4 (dir-4-1-2), Backupset-5 corresponds to Slice 5 (dir-4-1-1-1), Backupset-6 corresponds to Slice 6 (dir-4-1-1-2, dir-4-1-1-3), and Backupset-7 corresponds to Slice 7 (file-1, file-2, file-3). This FIG. 5 is provided for example only, and any other combination of directories and files are possible depending on file system layout and file sizes.

Figure 6:
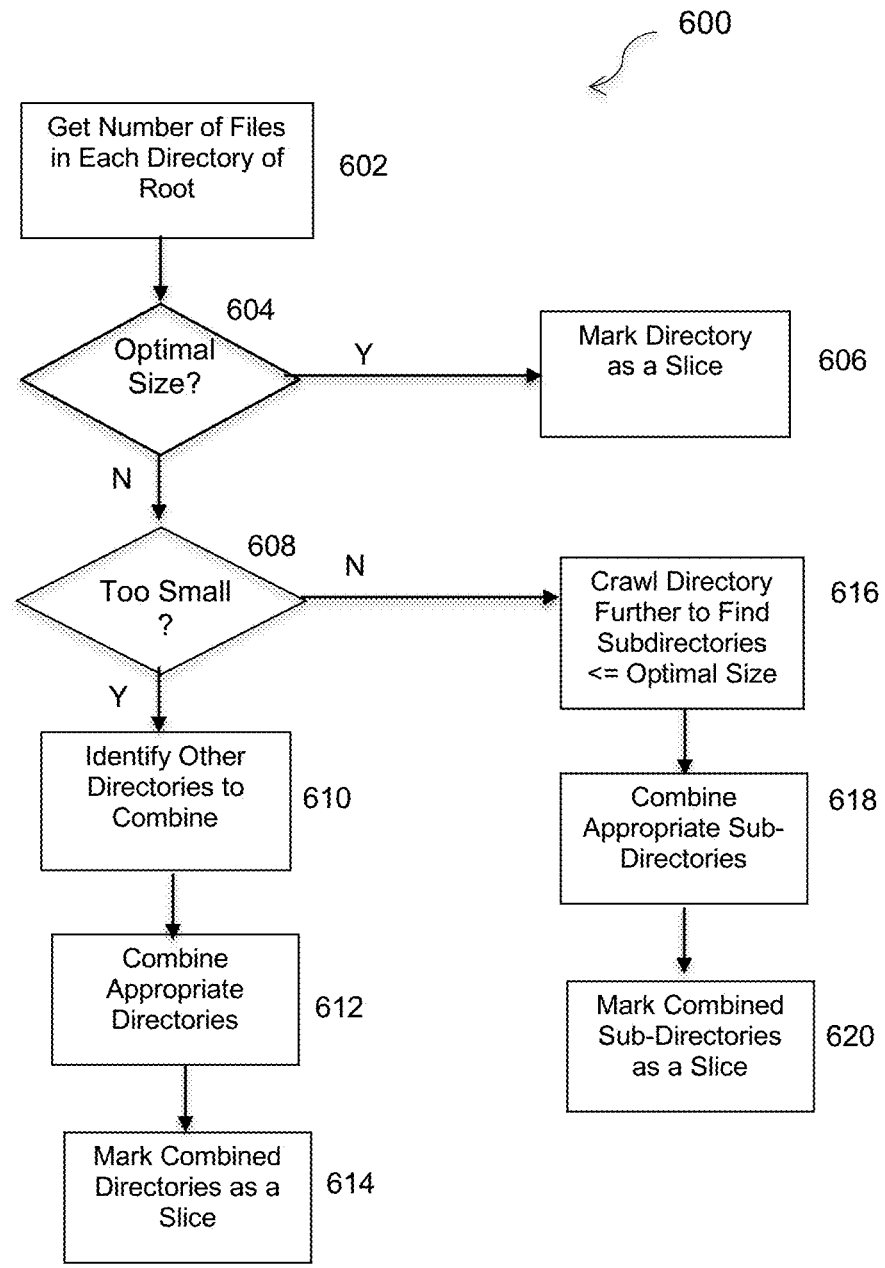
FIG. 6 is a flowchart that illustrates a method of slicing a file system by file count, under some embodiments.

For dense file systems, the slicer could perform slicing not by depth or size, but rather by the file count 306. This addresses the challenge where the file system is very dense and may have millions or even billions of small-sized files. Directories with large number of files can be broken into multiple small slices and allow backup agents to run more threads in parallel during backup. FIG. 6 is a flowchart that illustrates a method of slicing a file system by file count, under some embodiments. Process 600 starts by getting the number of files in each directory on the root of the file system, 602. In decision block 604, the number of files is compared to a defined optimum number of files for each slice, e.g., 1 million files/slice. Any directory which this optimal number of files (e.g., 1 million files or any other selected size optimal for the backup agent) is added as a slice, 606. For example, if dir-1 has 1 million files, this directory is marked this as slice-1.

If the directory is not of optimal size, it is determined whether the directory size is too small or too large with respect to the number of files. If the directory is too small, step 608, other directories are identified for combining with this directory to form a slice, 610. The appropriate directories are then combined, 612, and these combined directories are then marked as a single slice, 614. Thus, for example, if dir-2 has 700K files and dir-3 has 300K files, these two directories are combined into one slice, e.g., slice-2.

If the directory is too large (i.e., has too many files) as determined in 608, the directory is crawled further to find subdirectories with file numbers less than or equal to the optimal size, 616. For example, if Dir-4 is of size 1.2 million, in order to make up a slice of size 1 million, the process crawls through this directory further until it finds subdirectories with a number of files less than or equal to 1 million. The appropriate sub-directories are then combined, 618, and these combined sub-directories are then marked as a single slice, 620. An example of this process is shown in FIG. 5, where Backupset-3, Backupset-4, and Backupset-5 are formed by further crawling respective parent directories that are too large. These backupsets represent slices that are formed by combining the appropriate sub-directories, such as dir-4-1-1-2 and dir-4-1-1-3 for backupset 6 (slice 6).

In this method, for any files (rather than directories) on the root level, the process forms slices by combining root level files to equal the optimal number, e.g., 1 million files per slice. In this context, the number of files per slice is important, and not the size of each file (MB/GB, etc.). It should be noted that if the process slices on the number of files, it only cares about the number of files and not each file size, whereas if it slices on file sizes, it only cares about the total number of files within the slice, and not each file size.

As shown in the examples of FIG. 5, files are sliced to maintain as much contiguity as possible with respect to file and directory relationships. Maintaining contiguousness of files helps optimize later restore operations. In an embodiment, the slicer considers the contiguity of files with regard to combining directories and/or examining subdivision. As shown in FIG. 5, a backup set made up of two or more directories (e.g., Backupset-2) uses two related directories (dir-2 and dir-3). Likewise, a backup set made up of sub-directories within a directory that is too large will try to group sub-directories in a same sub-level of the directory, such as shown for Backupset-6. This contiguity may be based on logical file organization characteristics, time of creation/revision, common subject matter, common ownership, or any other characteristic used by the restore operation.

As shown in FIG. 3, the different slicing techniques 302-306 of slicer 202 use certain threshold values for the number of files and/or the size of each file. These values define a minimum or maximum value that triggers the grouping of directories into a single slice or the slicing of a directory into sub-directories for forming smaller slices. Any appropriate size or number value may be used as the threshold value for the size, file count, and depth-based slicing methods, depending on system constraints and methods. Examples given include a maximum file size of 100 GB per slice (for the size-based slicer 304 and depth-based slicer 302) or 1 million files per slice (for the file count-based slicer 306). Any other appropriate values may be used for these thresholds. Furthermore, there may be some margin or latitude given for each threshold to provide some tolerance for deviation. For example, a margin of plus/minus 10% to 15% may be provided for either or both of the number and size threshold values. These margins may also be tunable by the user or system administrator depending on system constraints and requirements.

In an embodiment, the different slicing methods of FIG. 3 may be combined in one or more ways. For example, the slicer 303 may first slice based on the size, and then re-slice based on file count, or vice-versa. This combination technique may be used to optimize the deployment of backup agent proxies relative to the slicers and/or how to optimize contiguity of the directories and files comprising the slices.

Figure 7:
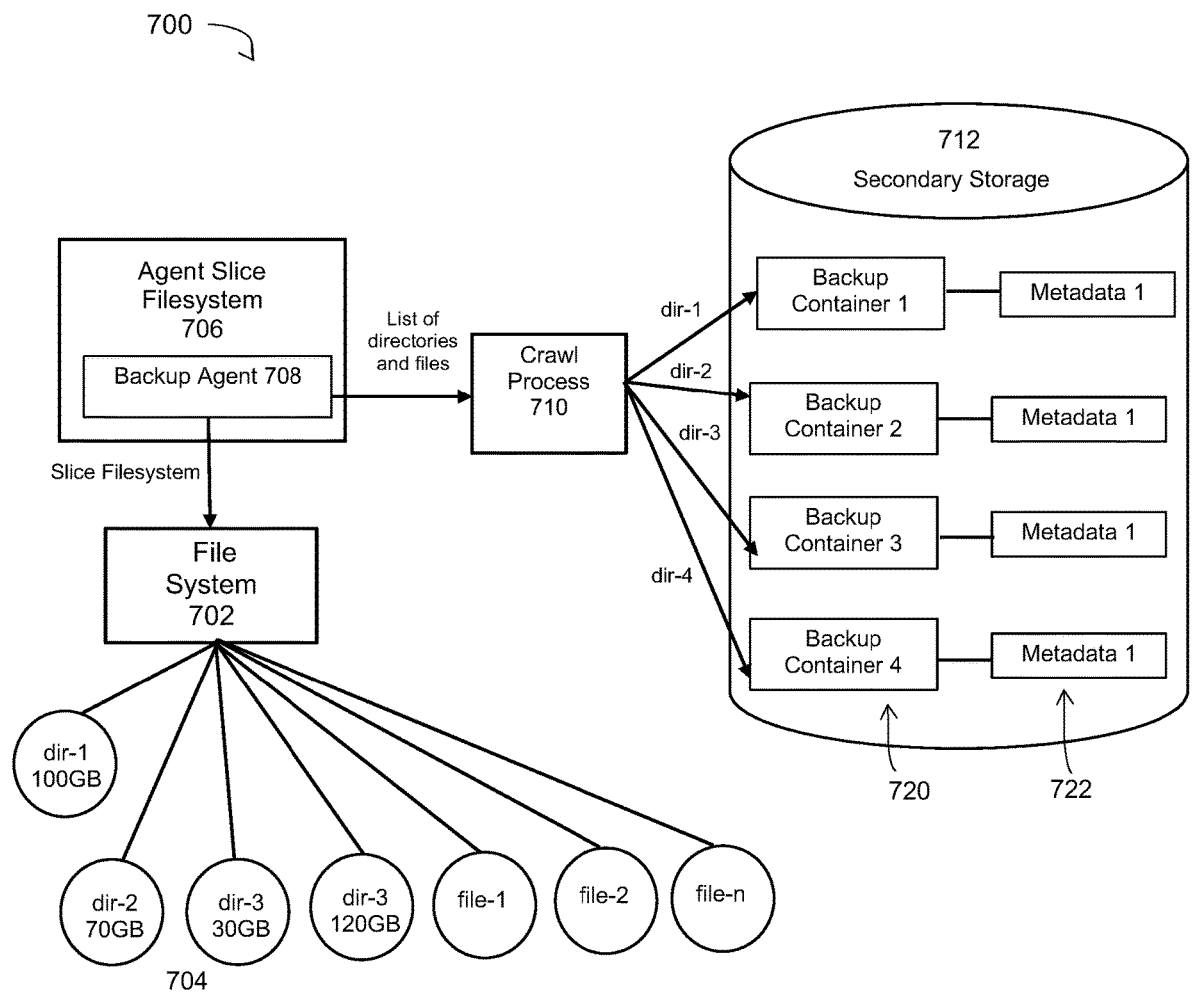
FIG. 7 illustrates a system for data processing between slicers and backup agents, under some embodiments.

As shown in FIG. 2, a number of backup agents 202 are deployed for different slicer instances 202. The backup agents act based on the information from the slicer and perform a unit of work represented by each slice. FIG. 7 illustrates a system for data processing between slicers and backup agents, under some embodiments. System 700 comprises a file system 702 that manages a number of files and directories 704, each of different sizes and compositions. System 700 includes a file system slicer agent 706 that partitions or reorganizes (slices) the directories and files of file system 702 into appropriately sized slices, using one or more of the slicing techniques described above. A backup agent 708 then sends a list of the directories and files assigned to each slice to a crawl process 710. The slices are then assigned to respective backup containers 720 (e.g., backup containers 1-4), which are stored, along with respective metadata 722 in a secondary storage location 712.

The crawl process 710 crawls each slice to read file data and metadata over the network and send for backup to backup media. Each slice represents a backup container in CDSF (compact disk file system) format. The crawl process crawls the slices in parallel, so that, for example, if there are 16 slices, crawl process will run 16 threads for each slice. During an incremental backup, the crawl process detects whether a file has changed since a last backup, and if not, the file will be skipped. There is generally no limit to the number of slices created or the number of threads, agents, or proxies. For example, the slicer might create 200 slices, and there may be only 16 threads. In this case a queue is formed and the process pulls slices off the queue as soon as it is done with a previous slice.

In an embodiment, the backup agents 708 use backup processes provided by a backup management process (e.g., 112 of FIG. 1). As such, they perform full, incremental, or differential backups with or without deduplication. A typical backup process comprises a full backup followed by a number of incremental backups, where the periodicity of full backups and intervening incremental backups is defined by a set backup schedule. A full backup is referred to as a 'level 0' backup. The backup agents perform certain tasks when working with level 0 backups. For example, slicing and working on a slice for level 0 requires some knowledge of the file system. This involves either a pre-scan of the file system that can inform the slicer or performing a best effort guess, such as slicing one level of depth. This is not particular interesting since it is assumed that level 0 scans happen once where an incremental backups happen each occurs afterwards. Thus, a first full backup scans all the directories and files of the file system, but it is preferable not to scan all these files again for each following incremental backup, since it can be assumed that the file system does not change drastically between incremental backups. Thus, a pre-scan procedure is used, or a method to look at past backups to provide a forecast of how the directories can be re-sliced. This pre-scan or best guess information is then stored in a catalog.

For incremental backups the slicing data and backup agents are combined. For each incremental backup, the slicer can look at the previous backup and slice using one or more of the slicing techniques as described above. This method does not require any pre-scan nor any special NAS application program interfaces (APIs), but does provide a close enough view of the actual file system. Since slicing information is stored in a catalog, such as a relation database or NoSQL key/value store, there is no need to traverse the entire network file system.

For example, for re-slicing based on the number of files in a directory, if a directory has 10,000 sub-directories and each directory has 10,000s of files, then the crawl time will be very large. To reduce the crawl time on single directory, the process re-slices the directory based on number of files greater than the average number of files in other directories. Each backup set will be smaller and the thread run time will also be smaller.

In an example where re-slicing is based on the size of files in a directory, if a directory and its sub-directories contain files with more than a few GBs (e.g., 100 GB), then the backup time of each directory will be very large. To reduce this backup time, on each directory, re-slice the directory based on size greater than average size of other directories. Each backup set will be smaller and thread run time will also be smaller.

As shown in FIG. 3, slicer 202 includes three slicing algorithms that can be used on a number of file system types: dense file systems, large file systems and mixed file systems. In an embodiment, the process includes an automatic slicing selection process that chooses which slicing algorithm to select. This also allows the process to switch between slicing methods during a single session. For this embodiment, the slicer looks at previous backup runs and stores this knowledge of past runs so that it can switch slicing algorithms from one to another or use a combination of different slicing algorithms. The slicer makes the switch by looking at previous runs and following the set of rules associated with each algorithm. For example: if the slicer notices a directory that has a few files but each file is large in size, it can slice that directory, and that directory only, by file size. On another sub-directory, if the slicer notices a large count of files, it can slice that directory by the number of files.

As shown in FIG. 7, the slices from slicer 117 are assigned to respective backup containers 720 that are stored with respective separate metadata files 722 secondary storage. In an embodiment, these individual metadata files are consolidated into a single metadata file for an NAS backup agent, such as denoted 'NASBackupSqllite.'

Figure 8:
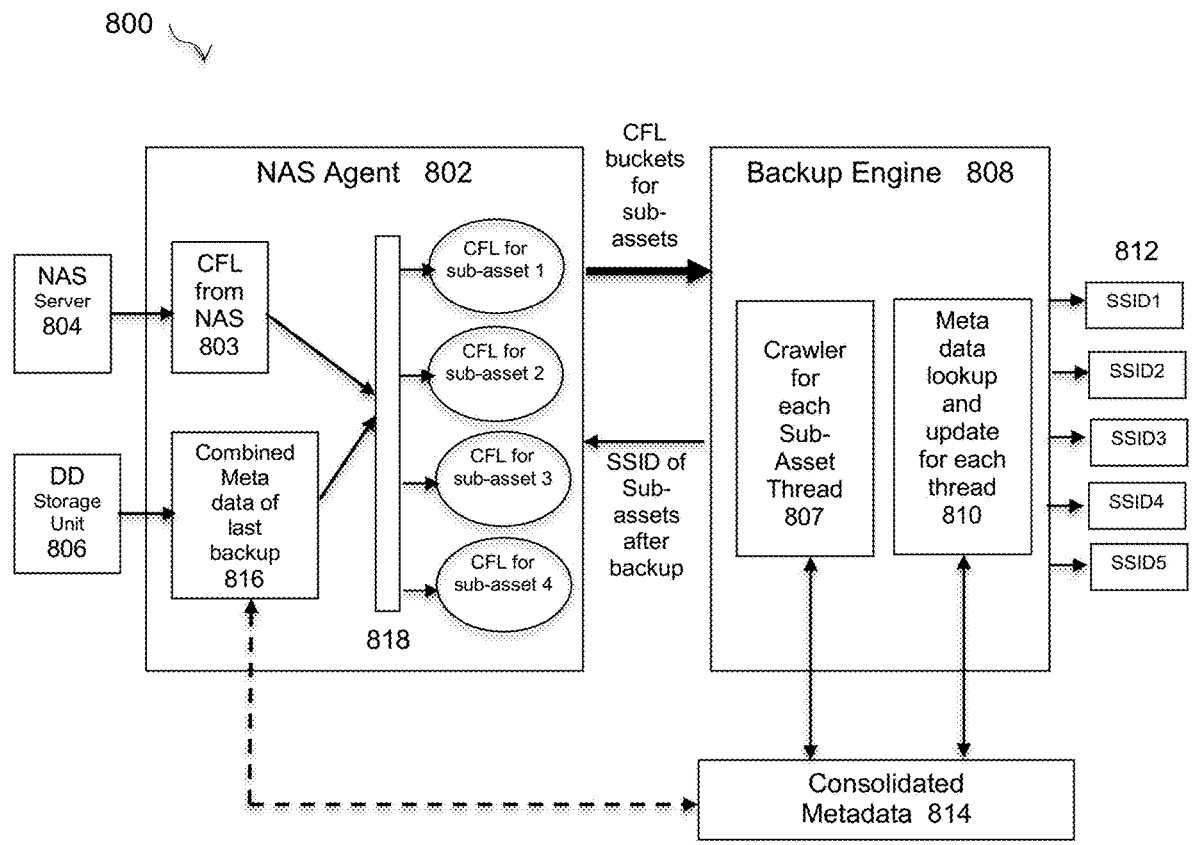
FIG. 8 illustrates a system for creating a single consolidated metadata file, under some embodiments.

FIG. 8 illustrates a system for creating a single consolidated metadata file, under some embodiments. As shown in FIG. 8, system 800 includes an NAS server 804 and Data Domain (or other) storage unit 806 that access NAS agent 802. The NAS agent 802 uses a change file list (CFL) 803 for each sub-asset of a number of sub-assets, such as denoted sub-asset 1, 2, 3, 4 in FIG. 8. The CFL may be generated by a crawler process that crawls the fileshare and identifies the changed elements to generate a changed file list (CFL), or the CFL may be made available to the NAS server 804 or agent by an external component. When such a changed file list is available beforehand, no crawling is required to identify and backup the changed data.

The NAS agent 802 includes a slicer process 818 that slices or separates the CFL 803 for an NAS device into individual change file lists for each the of the sub-assets, thus generating CFL for sub-asset 1, CFL for sub-asset 2, CFL for sub-asset 3, and CFL for sub-asset 4, as shown. The slice size is user defined, or can be set as a system default value based on storage constraints and backup policies. The slices from slicer 818 are generally configured to be roughly of equal size. The slicer may also be configured to provide for seamless redistribution or re-slicing of the sub-assets based on real time load on the asset. For example, if the size of a sub-asset grows bigger, it can be broken down into smaller sub-assets. Likewise, if a sub-asset size is significantly reduced it can be combined with other sub-assets to maintain parity of size with the other sub-assets.

The NAS agent 802 creates the CFL slices for each sub-asset for processing by a backup engine 808. The backup engine 808 includes a crawler 807 for each sub-asset thread and a metadata lookup and update process for each thread 810. Individual metadata files 812 are created by the backup engine during normal operation. The individual metadata files 812 are combined into a single metadata file to form consolidated metadata file 814, which may be embodied in a SQLite, or similar database. This consolidated metadata is then used by NAS agent 802 to form the combined metadata for a last backup operation for access by the DD storage unit 806.

At a high level, backing up the entire NAS device is essentially one single asset when present to the user/customer. The slicer process 818 of system 800 slices (breaks up) the NAS device into multiple slices or sub-assets. This is achieved by crawling the file system ahead of time to determine what files have changed, or by using a CFL from the NAS to inform what files have changed. After determining what files have changed, the system has one or more slices for a NAS. Each slice can be operated by a different file system agent that will only backup those files in that slice. Each slice with its own independent file system agent, which is referred to as a sub-asset. The backup operation for the entire NAS is complete when all slices have finished, i.e., all sub-assets are generated.

As shown in FIG. 8, the NAS agent 802 sends CFL buckets for each of the sub-assets to the backup engine 808. The backup engine 808 provides back to the NAS agent 802 the SSID of the sub-assets after a backup operation. A sub-asset SSID map is used to correlate the sub-asset to a corresponding SSID number, such as [sub-asset1-<SSID1>, sub-asset2-<SSID2>, sub-asset3-<SSID3>, sub-asset4-<SSID4>, and so on.

With respect to saveset ID (SSID) mapping and mapping files in a slice to an SQLite database, each slice can be treated as an independent backup, meaning that each slice is self-contained with data and metadata. Restoring slice data thus does not require information from other slices, as each slice has enough information, such as all the files within that slice and their respective metadata. Filesystem metadata can include filesystem statistical records like access/modification time, file size, file name, inode number, ACLs, permissions, file system path, and so on.

As shown above, the mapping process requires a unique identifier associated with each slice, e.g., [sub-assetn-<SSIDn>]. The system uses a timestamp string referred to as the SSID for this purpose. This breaks down the NAS target into smaller independent slices which can be backed up in parallel. In an embodiment, each such slice is backed up by using a depth-first search crawl mechanism and a backup of individual files/folders. When a particular element is being backed up, its properties are stored in an SQLite database that serves as the metadata for this slice. The properties include:
1. File name
2. Hash value of full path for easy reference
3. Access/modified/creation time hash of the element
4. Attribute values
5. Location in the backup container.
6. Checksum values.
7. Similar other identifiable attributes that help in indexing this element.

Every element (e.g., file/folder) being backed up as part of a particular slice will have an entry in the associated metadata database of that slice. The SSID value can then be used to identify the previous successful backup while performing an incremental backup. The NAS target backup will thus have multiple slice level SSID values mapped with it.

With respect to incremental backups, there are two different processes that must be handled. The first is CFL-based backup. In this case, certain file server devices provide the list of elements (files) that have been modified between two point-in-time snapshots. This includes newly-added, modified and removed elements. This CFL is the utilized to get the effective change list from a backup perspective without performing any crawling operations to ascertain the changes across the file server. During an incremental backup, the process can directly perform a backup of elements in this list and synthesize the remaining elements from the previous backup.

The second incremental backup type is a non-CFL based incremental backup. This case is applicable when a file server does not have the functionality of obtaining an available change list. In such cases, during an incremental backup, the process crawls over the entire file server to ascertain the status of a particular element with respect to the previous backup. This status can be one of: (1) if the element is present in the previous backup and is unchanged, (2) if this element is present in the previous backup but modified, or (3) if this is a new element, not present in the previous backup. Based on these operations, the process decides whether to backup or synthesize a particular element.

With respect to an incremental backup operation where the CFL is available (first type), the NAS Agent gets the CFL for the entire NAS share. Using the consolidated metadata file from last backup, it can identify the changes in each defined sub-asset and create buckets around it. These buckets can then be passed on to the backup engine as a JSON, or similar data element. The consolidated backup file can then be used again for identifying the unchanged elements for synthesis from the last backup. This is performed to get the location of the unchanged elements in the previous backup container for synthesizing them to the new container, such as in a DD to DD backup synthesize operation. A bucket is generally a storage location for a file or a slice.

With respect to an incremental backup operation where the CFL is not available (second type), after the slicing by the NAS agent, the backup engine starts an incremental backup for the individual sub-assets. The NAS agent passes the consolidated backup file of the previous backup to the NAS agent. It also passes the bucket of sub-assets to be backed up, which is the same as that for full backup. Here, the lookup for elements in each separate sub-asset (running in a separate thread) would be performed on the consolidated backup file only. The update and insertion of records can happen in the same consolidated file, or it can happen in individual metadata files like before which are then merged. Finally the individual metadata files can be merged.

Figure 9:
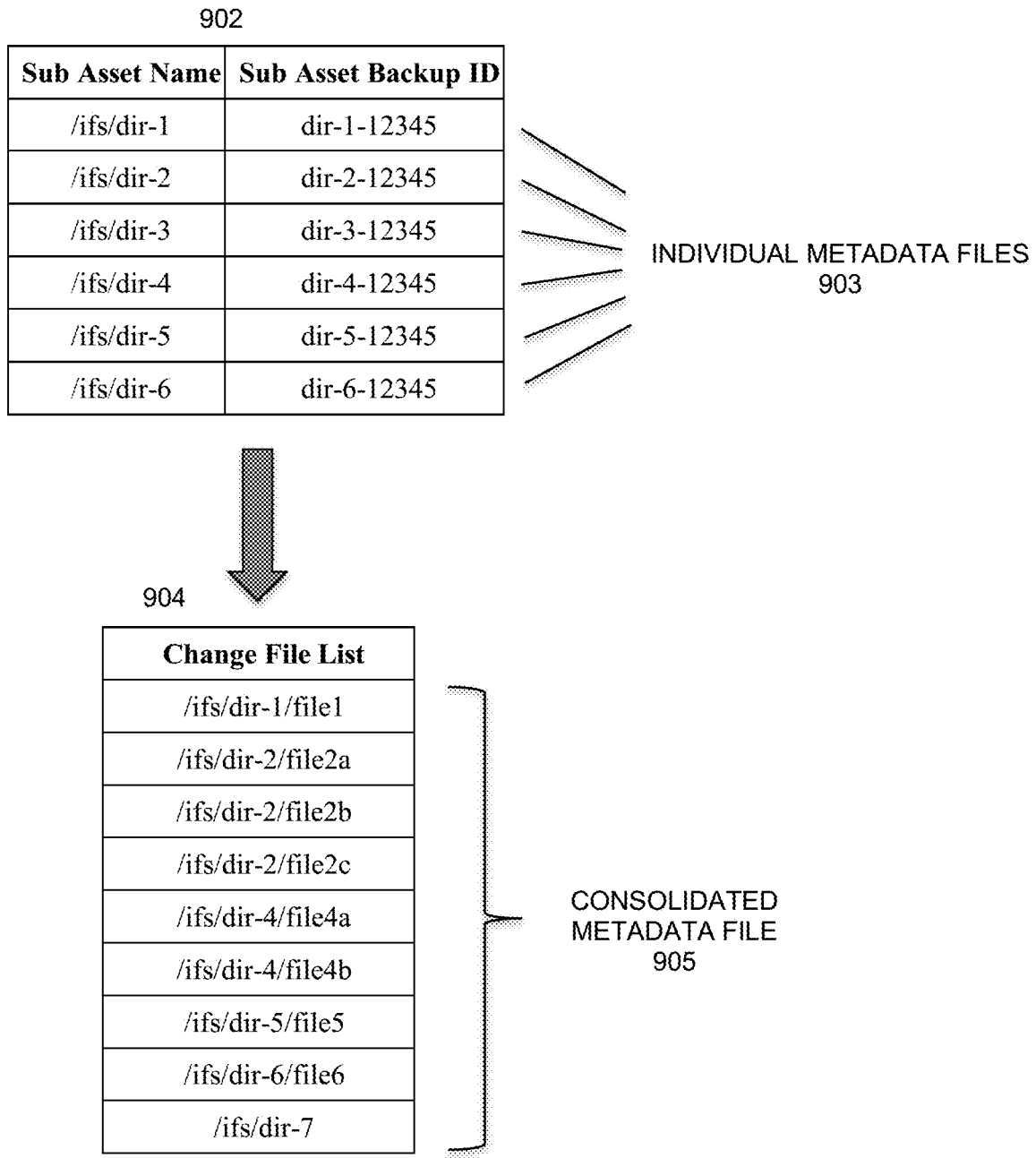
FIG. 9 illustrates an example set of individual metadata files consolidated into a single metadata file for an example embodiment.

As shown for the embodiment of FIG. 8 individual metadata files 812 are combined into a single metadata file to form consolidated SQLite metadata 814. FIG. 9 illustrates an example set of individual metadata files consolidated into a single metadata file for an example embodiment. Table 902 lists six example individual metadata files for sub-assets 1-6. These sub-assets are organized and named within an /ifs directory as dir-1, dir-2, dir-3, dir-4, dir-5, and dir-6. After backup operation, each sub-asset is referenced with a backup ID number, such as '12345' for the backup operation, thus generating metadata files dir-x-12345 for each of the six sub-assets, as shown in table 902.

The metadata manager process 115 merges or consolidates these individual metadata files 903 into a consolidated metadata file 905 as shown in table 904 of FIG. 9. The consolidation step can be performed with a simple appending operation. Since each slice is independent in that no one slice will have the same data as another slice, merging the metadata files (SQLite) can be done by appending all the different slice data to a single SQLite instance. Storing duplicates is not an issue since the slicing algorithm takes care of not backing up the same data in more than one slice.

In an embodiment, table 904 may be implemented as an SQLite metadata file that contains all of the elements comprising the entire NAS asset and sub-assets. The corresponding container ID where it is present is also added to each entry of the table. The process then sets up another table that contains details of the sub-assets and their backup properties. Any appropriate table architecture may be used, such as one that lists relevant items such as record_index, ID, Parent_ID, offset, hash, metadata, size, header_size, transaction ID, saveset_name, backup_level, start_time, size, retention_period, and so on.

Although embodiments are described with respect to SQLite, any other appropriate storage process can be used, such as a NoSQL database, like RocksDB, LevelDB, or even a simple TXT file storing the metadata on disk.

After the consolidated metadata file is created, the individual metadata files 903 or 812 are deleted from the backup system. This helps in avoiding redundant usage of backup storage in the form of duplication of metadata information.

The consolidated metadata file 905 provides a clear one-to-one mapping between each backup asset and its corresponding metadata. The process 115 can thus map all the constituent containers and refer to them from a single metadata file.

The consolidated metadata (e.g., NASBackupSQLite) table for each element can then be queried to obtain corresponding backup IDs. FIG. 10 is a table that illustrates a query result for the consolidated metadata table of FIG. 9. As shown in FIG. 10, table 1005 illustrates the case where a query in the CFL for 'file2c' within directory/ifs/dir-2/and for any file within directory ifs/dir-7 both return a 'not available' message, since these files were not contained in the consolidated metadata file 905 shown in table 904.

The unique backup IDs for the corresponding sub-asset name in the sub-asset backup ID table can then be queried to generate the buckets for the NAS agent 802 for the backup. If there is no entry for a particular file, the system can query the sub-asset list using the file path to identify the backup ID. FIG. 11 is a table that illustrates example sub-assets for previous backup operations, under an example embodiment. Table 1105 of FIG. 11 lists certain change file lists in the various directories of table 904 for the consolidated metadata file 905 of FIG. 9. In table 1105, the corresponding previous backup ID (e.g., 12345) is linked with a corresponding sub-asset name. As can be seen in this example, sub-asset/ifs/dir-7 is a new sub-asset so there is no previous backup for it.

Figure 12:
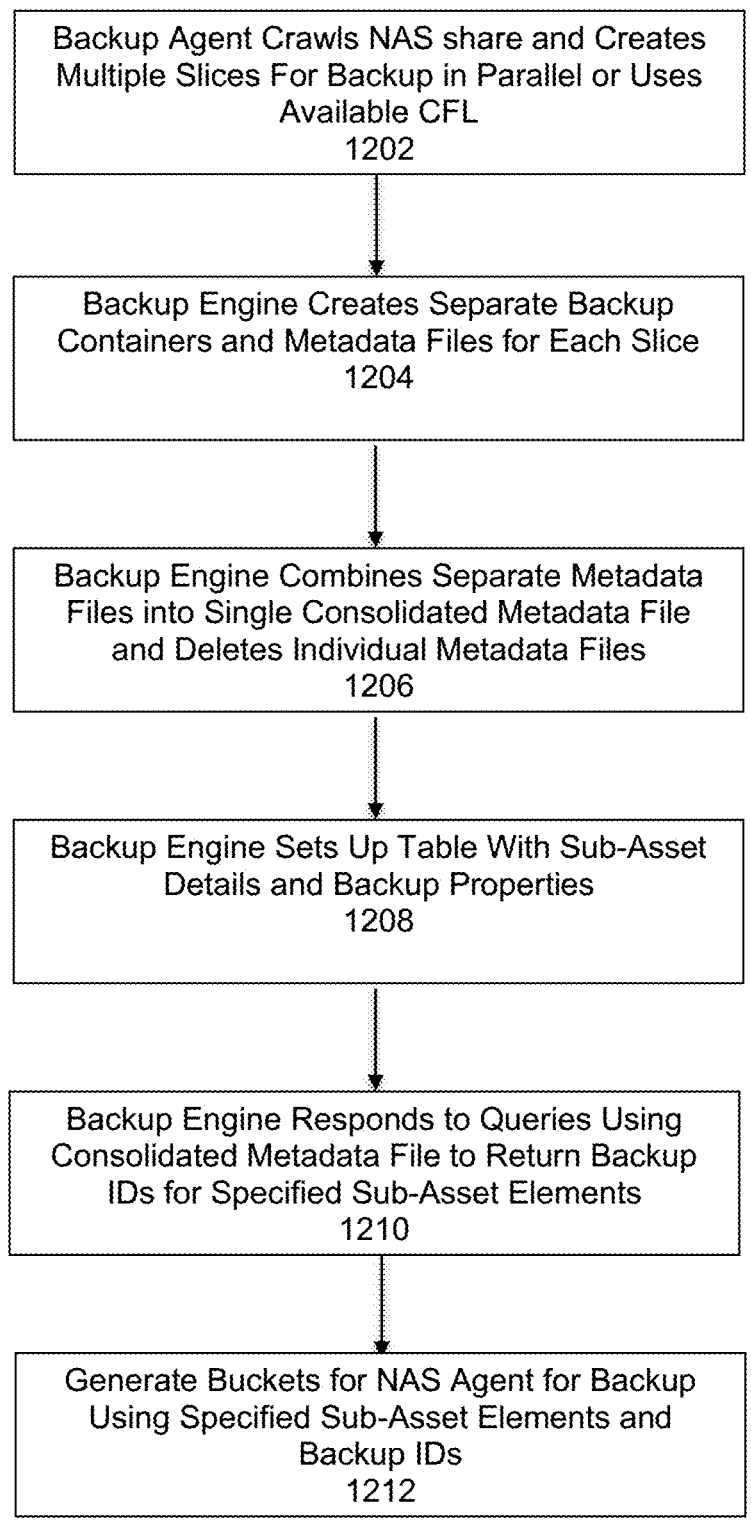
FIG. 12 is a flowchart illustrating a metadata management process using a consolidated metadata file, under some embodiments.

FIG. 12 is a flowchart illustrating a metadata management process using a consolidated metadata file, under some embodiments. The process of FIG. 12 begins with the backup agent crawling the fileshare (e.g., NAS share) and creating multiple slices for parallel backup, 1202. The process takes into account specific backup workflows with respect to when it must to crawl the fileshare and identify the changed elements to generate a changed file list (CFL), or when a changed file list is available beforehand. In this case, no crawling is required to identify and backup the changed data.

In step 1204, the backup engine creates separate backup containers and metadata files for each slice. As shown in FIGS. 8 and 9, the separate metadata files are then combined to form a single consolidated metadata file, 1206. The individual metadata files can then be deleted. The backup engine also sets up a table, as described above, with sub-asset details and backup properties, 1208.

The consolidated metadata table and backup table are then used to process backup queries. The backup engine responds to a query of the consolidated metadata for each sub-asset file to get their corresponding Backup IDs, 1210. It also responds to a query of the unique backup IDs for the corresponding sub-asset name in the sub-asset backup ID table to generate the buckets for the NAS agent for backup, 1212.

This metadata management process of FIG. 12 addresses the management of file level metadata for these individual slices in a manner that not only serves the purpose of having a unified backup metadata for future operations but also optimizes the storage of metadata by removing redundancies and duplication in case of split assets, and optimizes global search (queries) and indexing of backup data for faster analysis and file level recovery.

This process also has advantages with respect to performance of incremental backups. Where a changed file list is available between two point-in-time snapshots, the backup system is able to utilize the consolidated metadata to accurately identify the sub-assets where the changes have occurred. This helps to achieve forever incremental backups even when the split assets encounters changes across them. The seamless re-slicing of sub-assets based on real time loads using metadata management allows for continuation of seamless incremental backups for the data assets also. For example, if the asset size reduces, multiple sub-assets can be consolidated together into a single sub-asset and/or overly large assets can be re-sliced. In either case, the incremental backups can proceed with no additional processing overhead. The metadata management system performs incremental synthesis only on sub-assets where the changes have occurred.

The metadata management system improves current methods of processing enterprise-scale assets involving servicing the entire asset as a single unit. It provides an efficient mechanism for servicing the single asset to improve overall backup performance and replication of data. The consolidated metadata provides a one-to-one mapping between backup assets and their respective metadata. The process can map all the constituent containers and refer to them from the single metadata file that references to all elements across the asset and within the fileshare. Incremental backups can be performed without any considerations of the slices of the previous backup. The indexing and search facility can be provided at a global level by utilizing the consolidated metadata. File Level Recovery becomes seamless by eliminating the need to look in different metadata files for a particular element, and is crucial for performing any telemetry and data analytics operations. The described method of metadata handling thus allows for a scalable and fully functioning mechanism of performing fileshare backups.

Although embodiments have been described with respect to network backup comprising certain specific technologies, Data Domain backup servers, and certain backup agents or processes, such as vProxy, it should be noted that embodiments are not so limited, and that other backup systems and methods may also utilize the methods described herein. Moreover, although data assets are generally embodied as files, any other data, data structure, or data element may comprise a data asset for which metadata generally represents condensed information about this data asset. Furthermore, for purposes of description, embodiments are described with respect to NAS storage devices, but any other file-level storage system may also be used.

As described above, in an embodiment, system 100 processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 13:
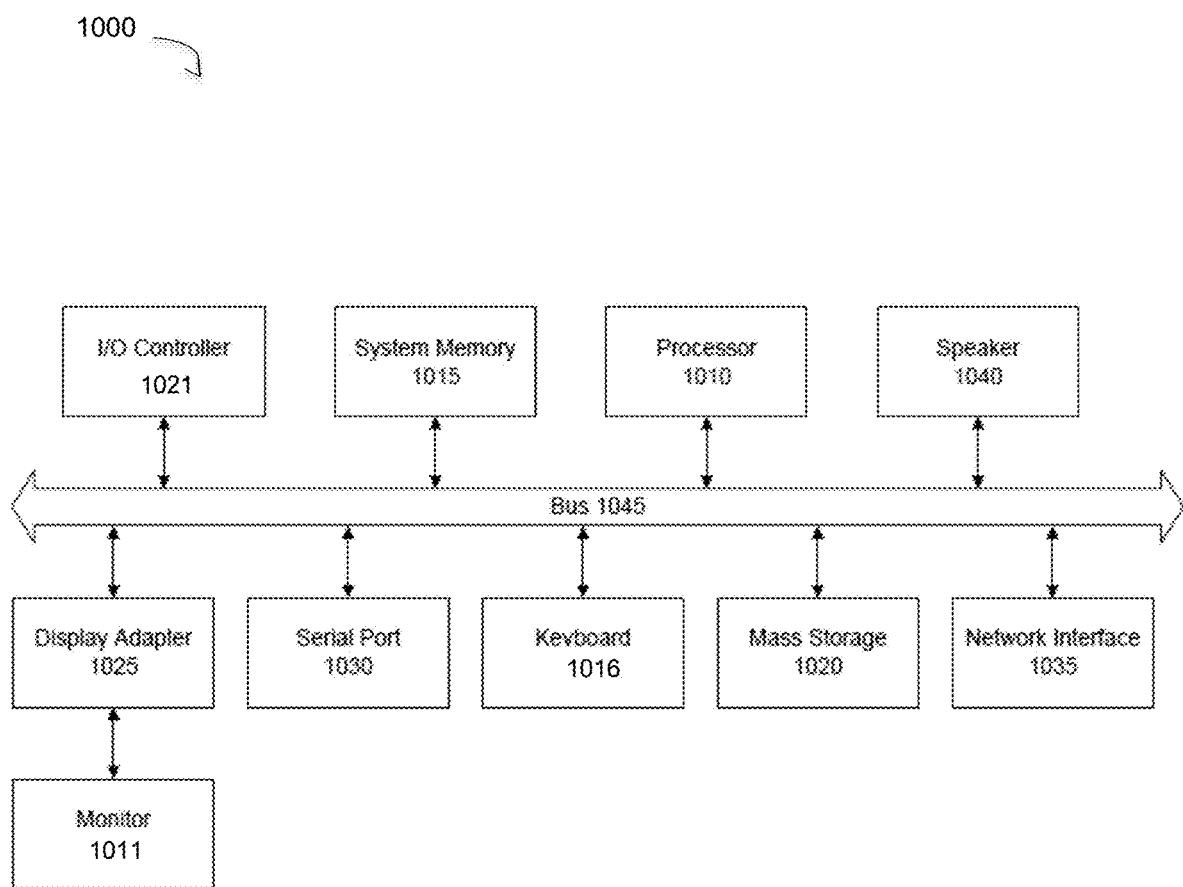
FIG. 13 is a block diagram of a computer system used to execute one or more software components of a system for managing metadata in a large-scale NAS network, under some embodiments.

FIG. 13 is a block diagram of a computer system used to execute one or more software components of a system for managing metadata in a large-scale NAS network, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is but one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of managing metadata for backup data in a network attached storage (NAS) fileshare, comprising:

obtaining a change file list (CFL) listing only files that are changed between two different snapshot backups, and obtained by one of an external source providing the CFL or a crawler process crawling the fileshare, to determine changes in files between successive backup operations, wherein the changes in a file comprise at least one of: newly added data, modified data, and deleted data;

creating, by a processor-based backup engine, multiple slices for parallel backup of the files, wherein each slice comprises one or more files of the NAS fileshare;

creating separate backup containers and separate metadata files for each slice;

combining the separate metadata files into a single consolidated metadata file;

defining file details and backup properties in a backup table;

processing, by the processor-based backup engine, a backup query using the consolidated metadata file and backup table;

responding to the backup query through an interface of the backup engine by returning a unique backup ID for each file of the files;

generating the multiple slices by an NAS agent for the backup;

performing an incremental backup using the CFL;

obtaining, by the NAS agent the CFL for the entire fileshare;

using the consolidated metadata file from a last backup to identify the changes in each file to generate storage buckets therefor;

passing the generated storage buckets to a backup engine; and using the consolidated metadata file again for identifying unchanged files for synthesis from the last backup to get a location of the unchanged files in the previous backup container for synthesizing into a new container.

2. The method of claim 1 further comprising dynamically redistributing the slices of the fileshare to create each of the multiple slices of approximately a same size.

3. The method of claim 2 wherein the redistributing comprises:
re-slicing a slice that is at least double an average slice size; and
combining together slices that are at least half the average slice size.

4. The method of claim 1 further comprising performing an incremental backup obtained by crawling the fileshare.

5. The method of claim 4 further comprising:
performing the incremental backup of the files on each slice;
passing, from the NAS agent to a file system agent, the consolidated metadata file of a previous backup;
passing, from the NAS agent to the file system agent, a bucket of files to be backed up;
looking up, in the consolidated metadata file only, files in each slice; and
updating and inserting records of changed files in the consolidated metadata file either in the individual metadata file prior to combining in the consolidated metadata file or in the consolidated metadata file after the combining.

6. The method of claim 1 further comprising storing the consolidated metadata file as a catalog separate from one or more catalogs of data for the fileshare.

7. A computer-implemented method of managing metadata for backup data in a network attached storage (NAS) fileshare, comprising:
defining, in a hardware component of a processor-based backup engine, a one-to-one mapping between a backup asset of a plurality of backup assets and its corresponding metadata in a consolidated metadata file;
mapping all the constituent containers of the plurality of backup assets for reference from the consolidated metadata file;
associating, in a backup table used by the backup engine, each backup asset with a backup job identifier of a last backup operation performed on the backup asset;
processing, through an interface of the backup engine, backup queries using the consolidated metadata file and the backup table,
obtaining a change file list (CFL) listing only files that are changed between two different snapshot backups; and
creating multiple slices for parallel backup of the files, wherein each slice includes a sub-asset comprising one or more files of the NAS fileshare, wherein the CFL is obtained by one of: an external source providing the CFL, or a crawler of the backup engine crawling the fileshare to determine changes in files between successive backup operations, wherein the changes in a file comprise at least one of: newly added data, modified data, and deleted data, the NAS agent storing the consolidated metadata file as a catalog separate from one or more catalogs of data for the fileshare, and further wherein the NAS agent further obtains the CFL for the entire fileshare, uses the consolidated metadata file from a last backup to identify the changes in each file to generate buckets therefor, passes the generated buckets to the backup engine, and uses the consolidated metadata file again to identify unchanged files for synthesis from the last backup to get a location of the unchanged files in the previous backup container for synthesizing into a new container.

8. The method of claim 7 wherein the CFL is obtained by one of: an external source providing the CFL, or crawling the fileshare to determine changes in files between successive backup operations, wherein the changes in a file comprise at least one of: newly added data, modified data, and deleted data.

9. The method of claim 8 further comprising dynamically redistributing the slices of the fileshare to create slices of approximately same size by re-slicing a slice that is at least double an average slice size, or combining together slices that are at least half the average slice size.

10. The method of claim 9 further comprising performing an incremental backup using one of the CFL as provided by the external source, or obtained by a crawler process crawling the fileshare.

11. The method of claim 10 further comprising:
obtaining, by the NAS agent, the CFL for the entire fileshare;
using the consolidated metadata file from a last backup to identify the changes in each file to generate buckets therefor;
passing the generated buckets to a backup engine; and
using the consolidated metadata file again for identifying unchanged files for synthesis from the last backup to get a location of the unchanged files in the previous backup container for synthesizing into a new.

12. The method of claim 10 further comprising:
performing the incremental backup of the files on each slice;
passing, from the NAS agent to a file system agent, the consolidated metadata file of a previous backup;
passing, from the NAS agent to the file system agent, a bucket of files to be backed up;
looking up, in the consolidated metadata file only, files in each slice; and
updating and inserting records of changed files in the consolidated metadata file either in the individual metadata file prior to combining in the consolidated metadata file or in the consolidated metadata file after the combining.

13. A system for managing metadata for backup data in a network attached storage (NAS) fileshare, comprising:
a hardware component comprising an NAS agent obtaining a change file list (CFL) listing only files that are changed between two different snapshot backups, creating multiple slices for parallel backup of the files, wherein each slice comprises one or more files of the NAS fileshare, creating separate backup containers and separate metadata files for each slice, combining the separate metadata files into a single consolidated metadata file, defining file details and backup properties in a backup table; and
a hardware-based backup engine component processing backup queries using the consolidated metadata file and backup table, responding to a backup query by returning a unique backup ID for each file of the files, and generating storage buckets by an NAS agent for the backup, wherein the CFL is obtained by one of: an external source providing the CFL, or a crawler of the backup engine crawling the fileshare to determine changes in files between successive backup operations, wherein the changes in a file comprise at least one of: newly added data, modified data, and deleted data, the NAS agent storing the consolidated metadata file as a catalog separate from one or more catalogs of data for the fileshare, and further wherein the NAS agent further obtains the CFL for the entire fileshare, uses the consolidated metadata file from a last backup to identify the changes in each file to generate buckets therefor, passes the generated buckets to the backup engine, and uses the consolidated metadata file again to identify unchanged files for synthesis from the last backup to get a location of the unchanged files in the previous backup container for synthesizing into a new container.

\* \* \* \* \*